(12) United States Patent
Tan (10) Patent No.: US 8,478,482 B2
(45) Date of Patent: Jul. 2, 2013

(54) POSITION DETECTION FOR ACTIVATION OF DEVICE AND METHODS THEREOF

(75) Inventor: Adrian K. Tan, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 332 days.

(21) Appl. No.: 12/720,738

(22) Filed: Mar. 10, 2010

(65) Prior Publication Data

US 2011/0224870 A1    Sep. 15, 2011

(51) Int. Cl.
*G06F 7/00* (2006.01)

(52) U.S. Cl.
USPC ............ 701/36; 455/41.2; 455/95; 455/456.3

(58) Field of Classification Search
USPC ................... 701/36; 455/456.1, 456.2, 456.3, 455/569.1, 569.2, 553.1, 41.2, 99, 426.1, 455/404.2, 418, 95
See application file for complete search history.

(56) References Cited

U.S. PATENT DOCUMENTS

| | | | |
|---|---|---|---|
| 5,548,810 A | 8/1996 | Riddell et al. | |
| 7,299,008 B2 * | 11/2007 | Gluck | 455/41.2 |
| 7,336,933 B2 | 2/2008 | Davis et al. | |
| 7,689,253 B2 * | 3/2010 | Basir | 455/563 |
| 7,689,254 B2 * | 3/2010 | Tanneberger et al. | 455/569.1 |
| 2003/0114107 A1 * | 6/2003 | Aoyagi | 455/41 |
| 2007/0142024 A1 * | 6/2007 | Clayton et al. | 455/403 |
| 2008/0122649 A1 * | 5/2008 | Liu et al. | 340/825.36 |
| 2008/0268768 A1 * | 10/2008 | Brown et al. | 455/1 |
| 2009/0011799 A1 * | 1/2009 | Douthitt et al. | 455/569.1 |
| 2009/0259349 A1 * | 10/2009 | Golenski | 701/2 |
| 2010/0057380 A1 * | 3/2010 | Kabumoto | 702/40 |
| 2010/0198428 A1 * | 8/2010 | Sultan et al. | 701/2 |

FOREIGN PATENT DOCUMENTS

| | | | |
|---|---|---|---|
| DE | 10100824 | * | 7/2002 |
| EP | 0719064 A2 | | 6/1996 |

* cited by examiner

*Primary Examiner* — Marthe Marc-Coleman
(74) *Attorney, Agent, or Firm* — Young, Basile, Hanlon & MacFarlane, P.C.

(57) ABSTRACT

Embodiments of position detection devices for vehicles and methods of position detection are provided. One embodiment of a detection device comprises a wireless device inside a vehicle, a mobile communication device paired to the wireless device, such that the wireless device automatically activates when it senses the mobile communication device within an operable range of the wireless device, a position sensing system configured to generate an output indicative of the mobile communication device's presence within the vehicle and a controller responsive to the output and configured to deactivate the wireless device when the output indicates that the mobile communication device's presence is not within the vehicle but is still within the operable range.

20 Claims, 6 Drawing Sheets

POSITION DETECTION FOR ACTIVATION OF DEVICE AND METHODS THEREOF

FIELD OF THE INVENTION

The present invention relates to position detection devices that activate or deactivate a second apparatus based on the detected presence of a first apparatus, and methods thereof.

BACKGROUND

Modern vehicles include many electronic systems and features that provide an increased level of convenience to the driver and passengers. One such system is the wireless control of and communication between a mobile phone and a hands-free device used, for example, in a vehicle when the vehicle is moving. Bluetooth is a common example of such a wireless protocol. The wireless device can be integrated into a vehicle's audio environment and programmed to automatically connect to a mobile phone when the mobile phone is in or near the vehicle. As wireless devices increase in operating range, mobile phones may remain connected to the wireless device after exiting the vehicle. This decreases the perceived quality and convenience of the wireless device in the vehicle because the wireless device will continue to function as if the mobile phone is still in the vehicle. This can also create privacy issues as the conversation can continue to be heard by any within the vehicle.

For example, this may occur when the driver has started the vehicle and has received or placed a call while standing outside of the vehicle. If the driver stands too close the vehicle, the hands-free system can activate. The mobile phone user cannot communicate with the phone and must switch back to handset mode manually or enter the vehicle. The instances of this happening can be more frequent in urban areas where, for example, a vehicle is temporarily parked for a driver or passenger to enter a shop or convenience store while other passengers remain in the vehicle.

SUMMARY

Disclosed herein are embodiments of position detection devices for vehicles and methods of position detection. One embodiment of a detection device comprises a wireless device inside a vehicle, a mobile communication device paired to the wireless device, such that the wireless device automatically activates when it senses the mobile communication device within an operable range of the wireless device, a position sensing system configured to generate an output indicative of the mobile communication device's presence within the vehicle and a controller responsive to the output and configured to deactivate the wireless device when the output indicates that the mobile communication device's presence is not within the vehicle.

Embodiments of the detection device may further comprise a position sensing system with more than one mobile transmitter. The wireless device is paired with more than one mobile communication device, one mobile communication device associated with one of the more than one mobile transmitter. The receiver is configured to generate an output indicative of each mobile communication device's presence within the vehicle. The controller is further configured to deactivate the wireless device for each of the mobile communication devices having an associated output indicative that the mobile communication device's presence is not within the vehicle.

One embodiment of a method of detecting a device within a vehicle comprises pairing a wireless device located within the vehicle with a mobile communication device such that the wireless device is activated when the mobile communication device is within an operable range of the wireless device. A mobile communication device's presence is detected with a position sensing system. An output is generated indicative of the mobile communication device's presence and communicated to a controller responsive to the output. The wireless device is deactivated with the controller when the output indicates that the mobile communication device's position is not within the vehicle.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
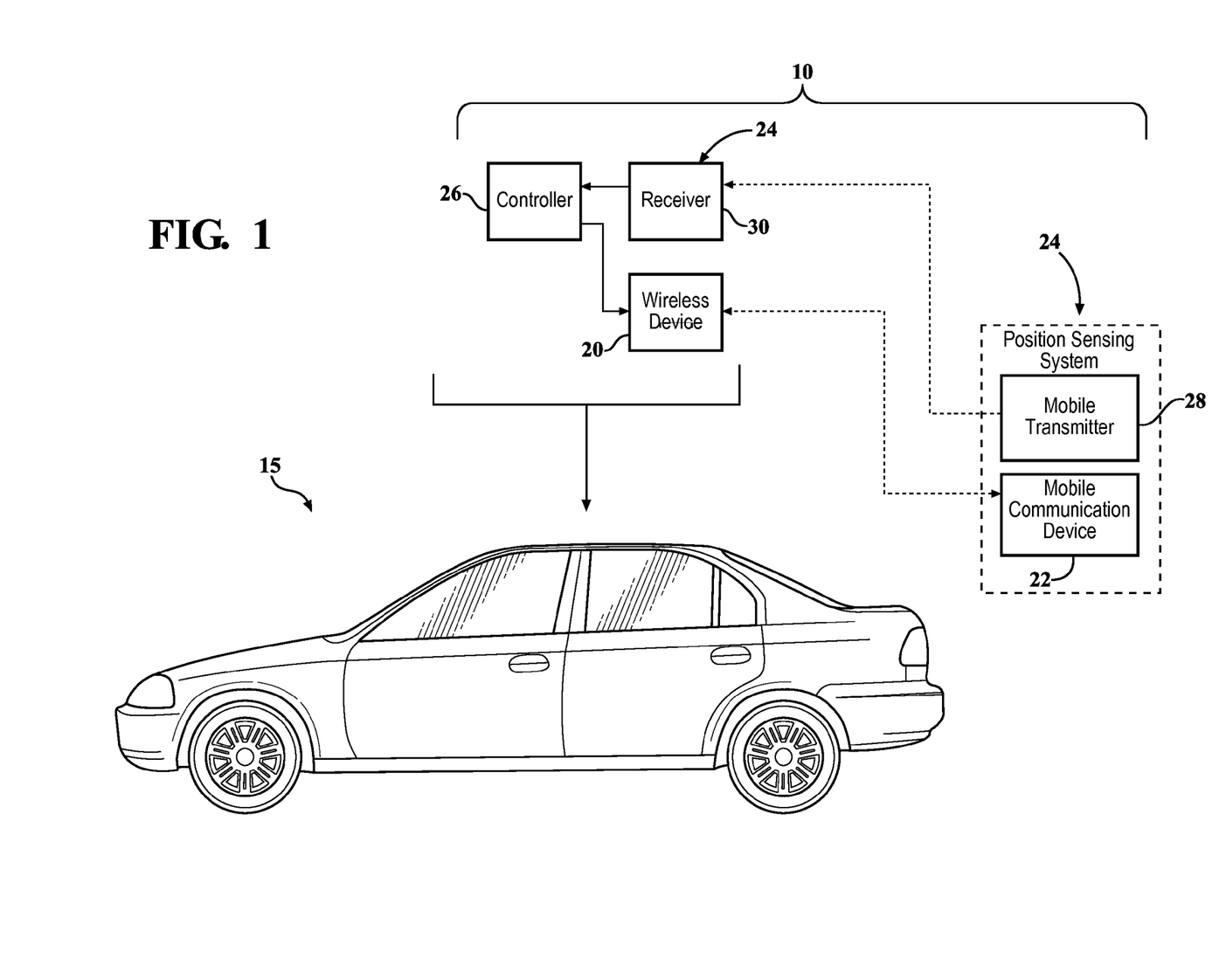
FIG. 1 is a schematic diagram of an embodiment of a detection system for a vehicle as disclosed herein.

Referring to FIG. 1, an embodiment of a detection system 10 for detecting the presence of a device relative to a vehicle 15 is illustrated. The detection system 10 comprises a wireless device 20 located inside a vehicle 15. A mobile communication device 22 is paired to the wireless device 20, such that the wireless device 20 automatically activates when it senses the mobile communication device 22 within an operable range 32 of the wireless device 20. A position sensing system 24 is configured to generate an output indicative of the mobile communication device's presence 22 within the vehicle 15. A controller 26 is responsive to the output and is configured to deactivate the wireless device 20 when the output indicates that the mobile communication device's presence 22 is not within the vehicle 15.

The detection system 10 can be used with any type of vehicle 15. A sedan is shown in the figures for illustrative purposes only and is not meant to be limiting. The wireless device 20 is, for example, a Bluetooth device for use with a mobile communication device 22 such as a mobile phone. Wireless devices 20 such as those using the Bluetooth services generally require authentication, and as such require pairing with the mobile communication device 22 before they allow the mobile communication device 22 such as a mobile phone to use the Bluetooth service.

The wireless device 20 can be located in the vehicle 15 in any location desired or required by the manufacturer or installer. Typically, the wireless device 20 is located in the passenger compartment of the vehicle 15. As a non-limiting example, the wireless device 20 may be installed within the instrument panel of the vehicle 15, with a user interface mounted on the dashboard of the vehicle 15 within reach of the driver. The wireless device 20 can be integrated into the audio system of the vehicle 15, so that the person on the other end of the mobile communication device 22 is heard through the speakers of the vehicle 15 and the driver or passenger can speak into a vehicle mounted microphone.

Figure 2:
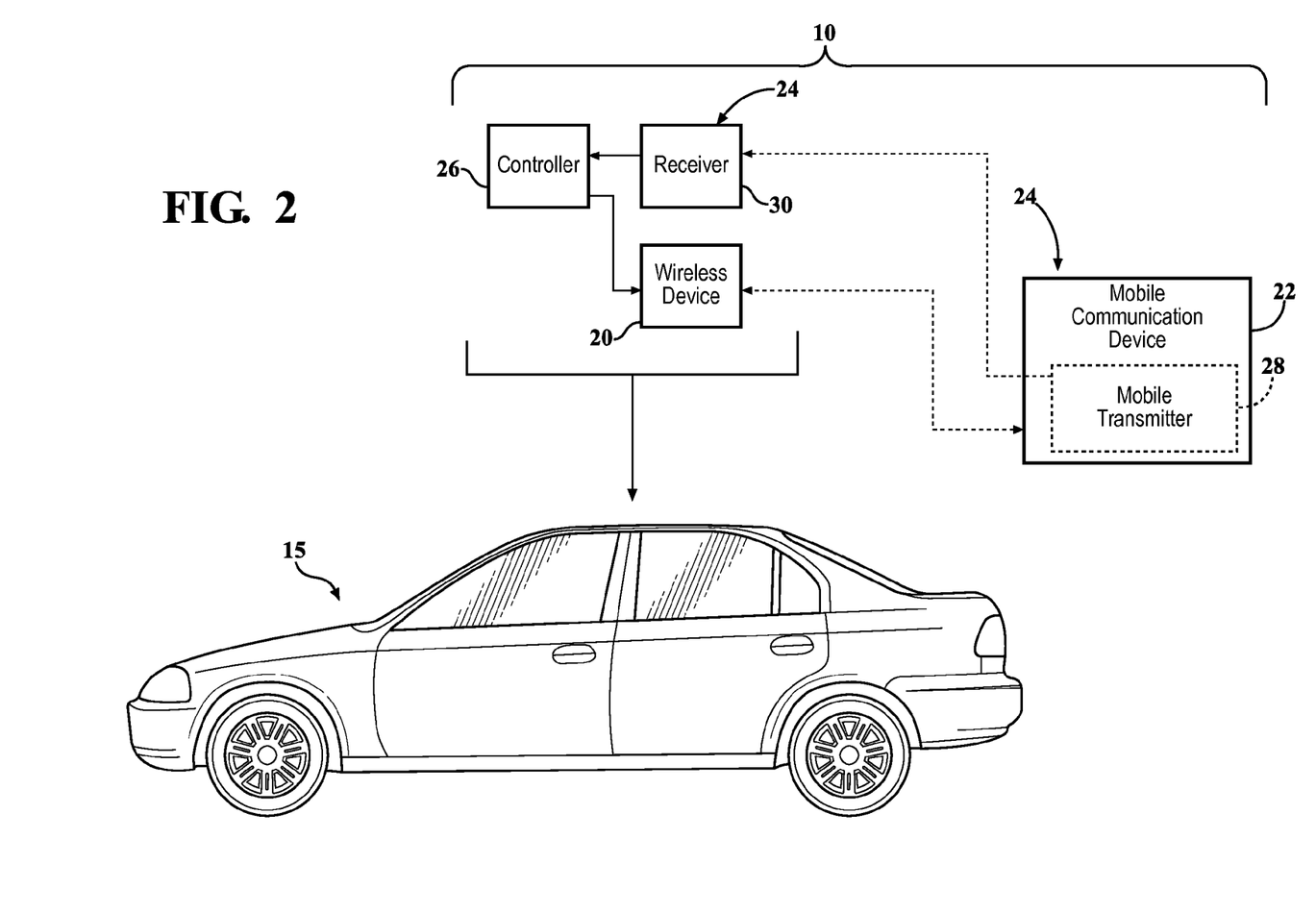
FIG. 2 is a schematic diagram of another embodiment of a detection system for a vehicle as disclosed herein.

The position sensing system 24 can comprise, for example, a mobile transmitter 28 and a receiver 30. The mobile transmitter 28 can be transported by the mobile communication device 22 user. For example, the mobile transmitter 28 may be a key fob also used to operate the vehicle 15. It is also contemplated that the mobile transmitter 28 be incorporated into the mobile communication device 22 itself, as shown in FIG. 2.

The receiver 30 can be located within the vehicle 15 in any location desired or required by the manufacturer or installer. The mobile transmitter 28 relays its position, which is indicative of the position of the mobile communication device 22, to the receiver 30. For example, the mobile transmitter 28 can transmit signals and the receiver 30 can employ a vehicle antenna to receive the signals and can triangulate its position based upon the signals. This can be reversed, with the receiver 30 employing the vehicle antenna to transmit the signals and a mobile "transmitter" 28 receiving the signals, triangulating the position based upon the signals, and transmitting a signal back to the receiver 30 indicative of the position. The position can be independently determined with, for example, a GPS portable navigation device and transmitted to either the receiver 30 or the mobile transmitter 28. Additionally, multiple receivers 30 may be installed in the vehicle to facilitate triangulation of the position of the mobile transmitter 28. Those with skill in the art will recognize that these are provided by way of example and not limitation, and other position sensing systems can be used as desired or required.

The mobile transmitter 28 can communicate with the receiver 30 with electronic communication or with wireless communication. Examples of wireless communication are radio frequency broadcast transmission and infra red transmissions. These are provided by way of example and not limitation and other means of communication known to those skilled in the art can be used. As another example, the wireless device 20 signal strength might also be used to determine the location of the mobile communication device 22. A reference or baseline strength when the mobile communication device 22 is within the vehicle can be recorded by the system and signal strengths below this level could indicate the mobile communications device 22 is outside of the vehicle 15.

The output from the position sensing system 24 is transmitted to the controller 26, which is responsive to the output. The controller 26 can be, for example, a central processing unit. The controller 26 can be located in the vehicle 15 in any location desired or required by the manufacturer or installer. The position sensing system 24 can communicate with the controller 26 with electronic communication or with wireless communication, depending on the type of system used. For example, the controller 26 can be located within the vehicle 15 and hardwired to the controller 26 for electronic communication. The controller 26 can be located within the vehicle 15 and set up for wireless communication with the receiver 30. Other means of communication known to those skilled in the art can also be used. It is also contemplated that the controller 26 is a portable device that can be carried with the user of the mobile communication device 22.

The controller 26 is programmed and configured to deactivate the wireless device 20 if the output of the position sensing system 24 indicates that the mobile communication device 22 is no longer within the vehicle 15. If the output indicates that the mobile communication device 22 is within the vehicle, the wireless device 20 is allowed to activate as it normally would. Deactivate as used herein means to interrupt operation of the wireless device 20 with the mobile communication device 22. When this occurs, the mobile communication device 22 must be used without the wireless device 20. As non-limiting examples, interruption can be due to authentication interruption between the wireless device 20 and the mobile communication device 22, disabling the hands-free function, or can be interruption of power to the wireless device 20.

Figure 3:
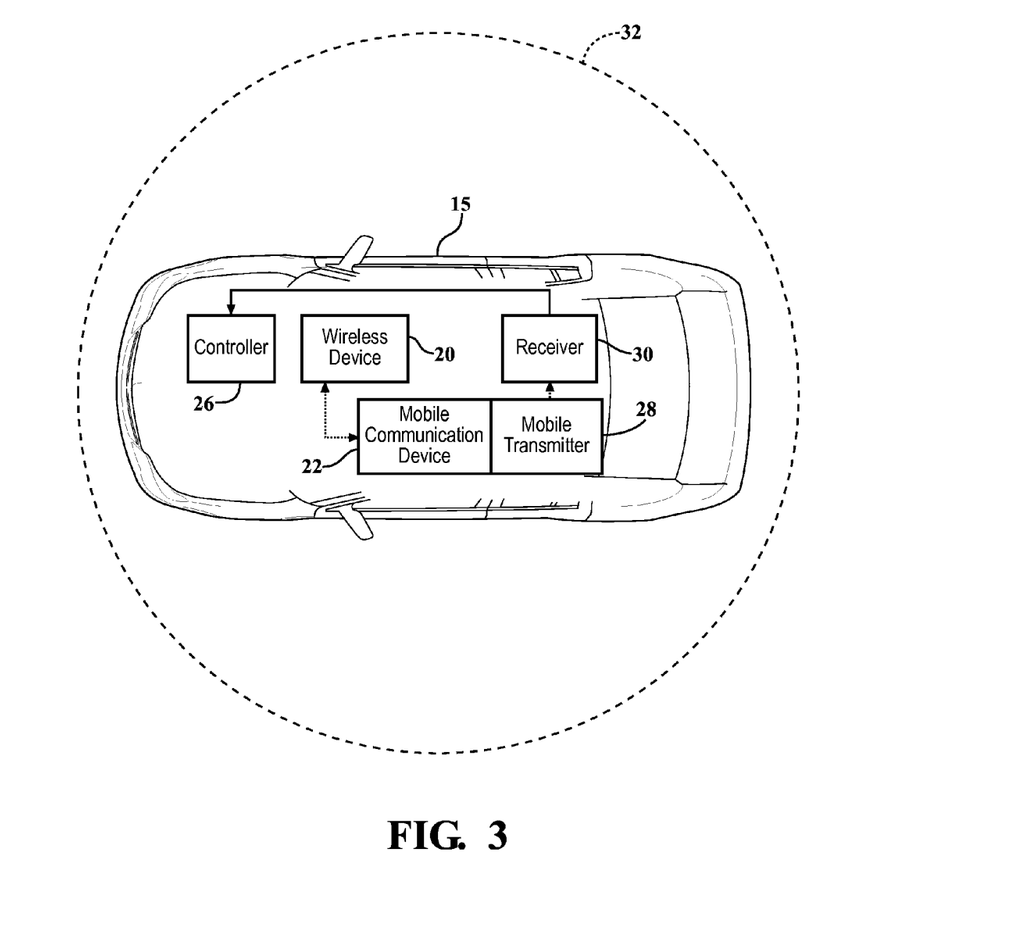
FIG. 3 is a plan view of the vehicle in the schematic diagram of the detection system of FIG. 1 with the mobile communication device within the vehicle.

FIG. 3 illustrates the operating range 32 of the wireless device 20 with respect to the vehicle 15. When the receiver 30 detects from the mobile transmitter 28 that the mobile communication device 22 is within the vehicle 15, the output to the controller 26 indicates as such and the controller 26 does not deactivate the wireless device 20. Accordingly, the wireless device 20 and the mobile communication device 22 operate as configured.

Figure 4:
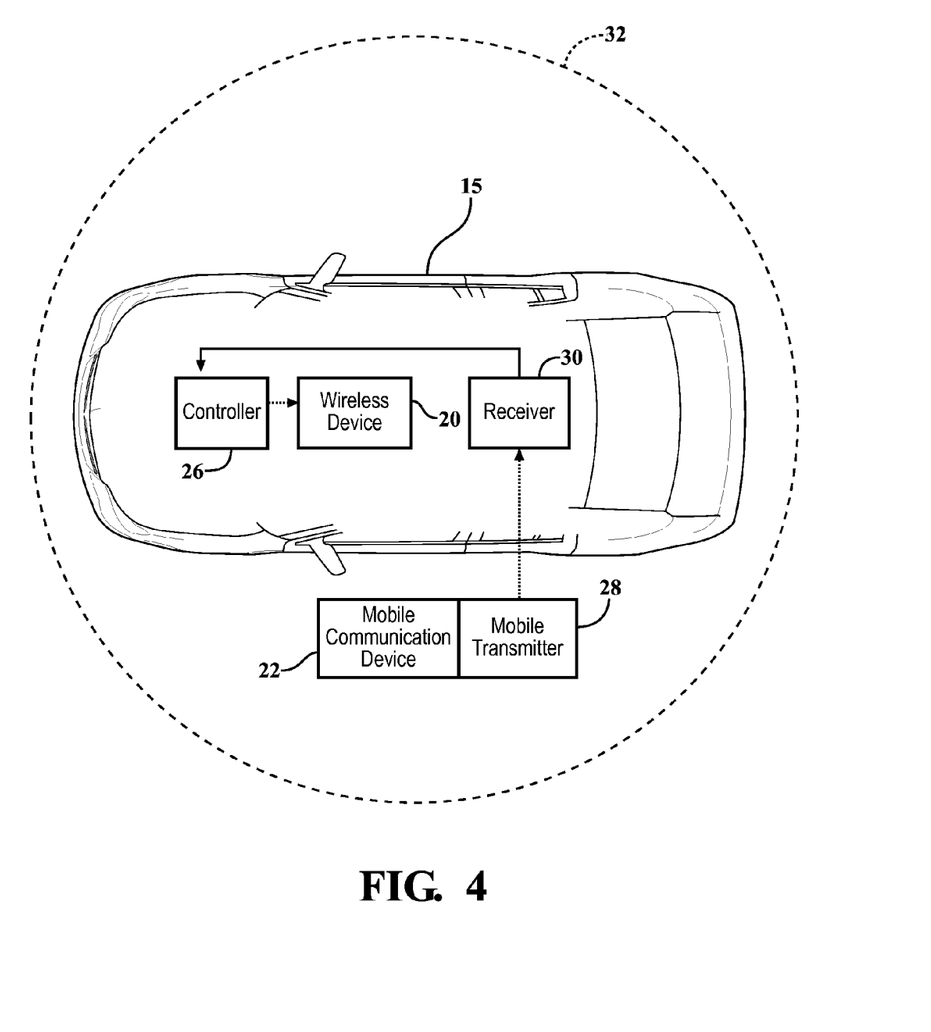
FIG. 4 is a plan view of the vehicle in the schematic diagram of the detection system of FIG. 1 with the mobile communication device outside of the vehicle.

FIG. 4 illustrates the same operating range 32 of the wireless device 20 with respect to the vehicle 15 as FIG. 3. However, as shown, the receiver 30 detects from the mobile transmitter 28 that the mobile communication device 22 is not in the vehicle 15. The receiver 30 outputs to the controller 26 an indication that the mobile communication device 22 is outside of the vehicle 15. In response, the controller 26 deactivates the wireless device 20 even though the mobile communication device remains in the operable range 32.

The controller 26 may be further configured to provide a warning to a user of the mobile communication device 22 that the wireless device 20 has been deactivated. The warning may be an audio signal, a visual signal, or both. For example, the warning may be a beep, or a recorded voice. The signal may be a light that turns on or flashes, or an indication on a display of the mobile communication device 22. These are provided by way of example and are not meant to be limiting. Other warning signals known to those skilled in the art may be used. The warning may be emitted directly from the controller 26, or may be provided by the mobile transmitter 28 or mobile communication device 22 after receiving an output from the controller 26.

The controller 26 can be further configured to reactivate the wireless device 20 if the controller 26 receives output from the position sensing system 24 that indicates the mobile communication device's presence 22 is within the vehicle 15. This would allow a user of the mobile communication device 22 to continue a conversation, for example when filling up with gas at a gas station, without any interruption.

Figure 5:
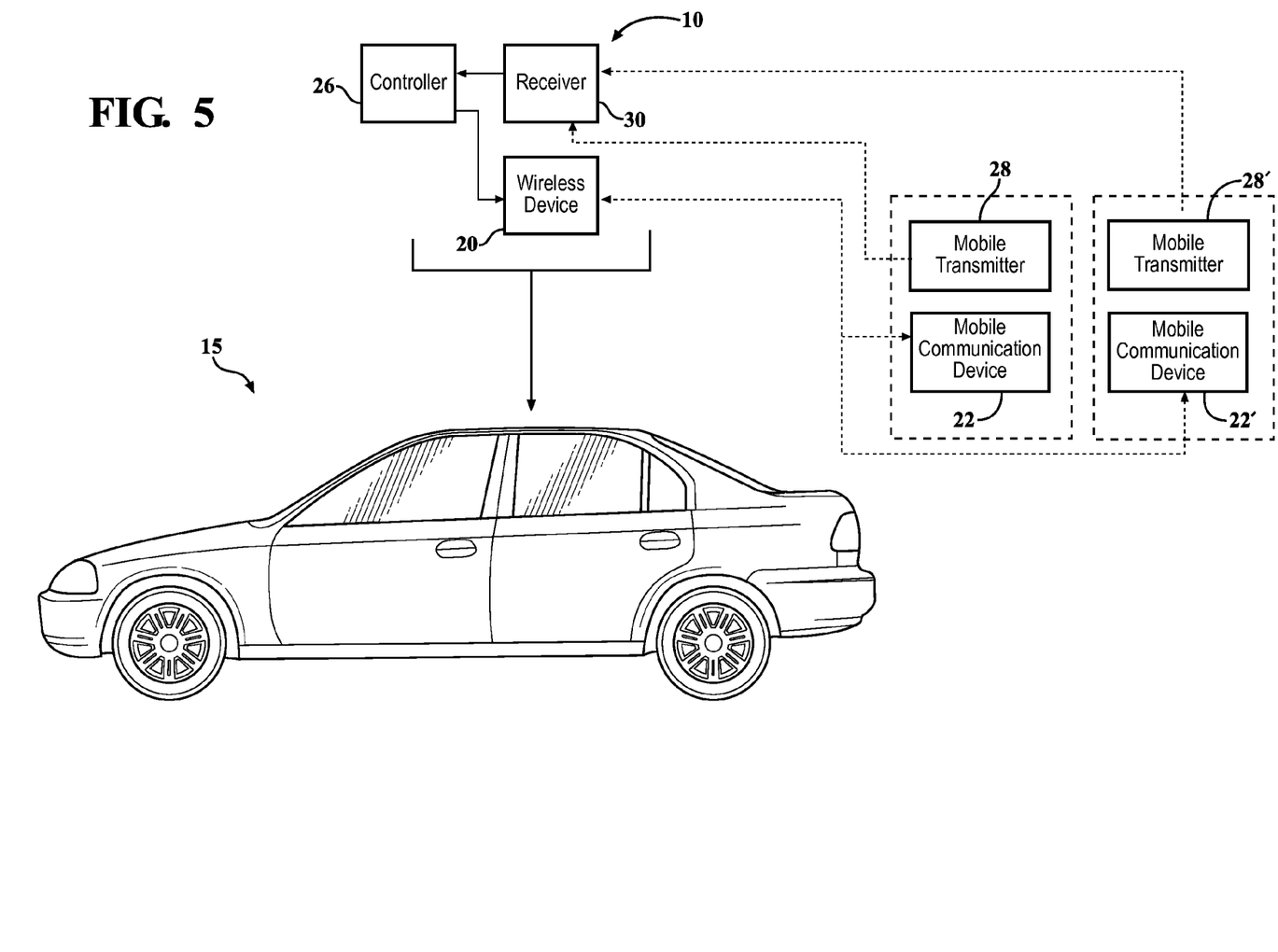
FIG. 5 is a schematic diagram of yet another embodiment of a detection system for a vehicle as disclosed herein.

In another embodiment of the position detection device, the position sensing system 24 may comprise more than one mobile transmitter. As shown in FIG. 5, the position sensing system 24 comprises mobile transmitter 28 and mobile transmitter 28'. The wireless device 20 can be paired with more than one mobile communication device 22, 22', with each of the mobile communication devices 22, 22' associated with a mobile transmitter 28, 28'. For example, a driver of the vehicle 15 may transport both mobile communication device 22 and a key fob having the mobile transmitter 28. Another potential driver of the same vehicle 15, such as another member of the driver's family, may transport mobile communication device 22' and a key fob with mobile transmitter 28'.

The receiver 30 can be configured to generate an output indicative of each mobile communication device's presence 22, 22' within the vehicle 15 and communicate each output to the controller 26. The controller 26 can be configured to deactivate the wireless device 20 for each of the mobile communication devices 22, 22' having an associated output indicative that the mobile communication device's 22, 22' presence is not within the vehicle 15.

As a non-limiting example, a situation can arise where a driver and a passenger each have a key fob with a mobile transmitter 28, 28' that operates a shared vehicle 15, and each have a mobile communication device 22, 22' paired with the wireless device 20 of the vehicle 15. If both driver and passenger are in the vehicle, the wireless device 20 will typically only authenticate with one of the mobile communication devices 22, 22' at a time, or prioritize one mobile communication device 22, 22' over the others. Typically, the driver's mobile communication device 22 will take precedence over the passenger's mobile communication device 22'. This preference can be a function of the mobile communication devices 22, 22'. For example, one mobile communication device 22 or 22' can be manually turned off. The preference may be a function of the wireless device 20, wherein the wireless device 20 is programmed with the preferences. These are provided as examples and are not meant to be limiting.

If the driver exits the vehicle with the mobile communication device 22, the position sensing system 24 will sense the absence of the driver's mobile communication device 22 from within the passenger compartment, and communicate an output indicative of the absence of the driver's mobile communication device 22 to the controller 26, which will deactivate the wireless device 20 from operating with the driver's mobile communication device 22. At that time, if the passenger remains in the vehicle with the passenger's mobile communication device 22', the controller 26 can be programmed to activate the wireless device 20 to operate with the passenger's mobile communication device 22'. If the driver reenters the vehicle 15 while still using the driver's mobile communication device 22, it is contemplated that the controller 26 can be programmed to reactive the wireless device 20 with the driver's mobile communication device 22 and deactivate the wireless device 20 from the passenger's mobile communication device 22'. Alternatively, as desired or required, the controller 26 can be programmed to keep the wireless device 20 deactivated with the driver's mobile communication device 22 and maintain activation of the wireless device 20 with the passenger's mobile communication device 22' if the passenger continues to use the passenger's mobile communication device 22' in conjunction with the wireless device 20 at the time the driver reenters the vehicle 15.

Figure 6:
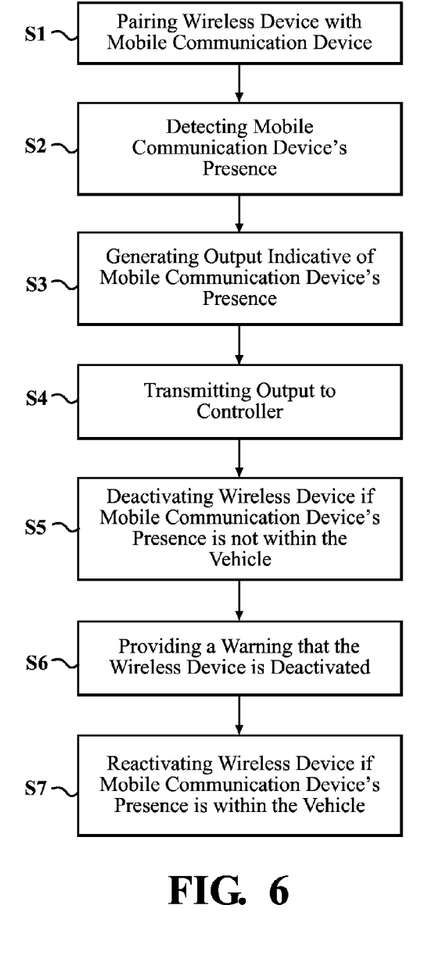
FIG. 6 is a flow chart of an example of a method of detecting the presence of a device within a vehicle.

Also disclosed herein are methods of detecting a presence of a device within a vehicle. One such method for detecting the presence of a device within a vehicle comprises the following steps. The reference numerals refer to FIGS. 1-4, while the steps are shown in FIG. 6. In step S1, a wireless device 20 located within the vehicle 15 is paired with a mobile communication device 22 such that the wireless device 20 is activated when the mobile communication device 22 is within an operable range 32 of the wireless device 20.

In step S2, the mobile communication device's 22 presence is detected with a position sensing system 24. An output is generated indicative of the mobile communication device's 22 presence in step S3. The output indicates whether the mobile communication device 22 is inside the vehicle or outside of the vehicle 15. The output is communicated to a controller 26 responsive to the output in step S4. In step S5, when the output indicates that the mobile communication device 22 is outside of the vehicle 15, the controller 26 deactivates the wireless device 20 so that the wireless device 20 no longer communicates with the mobile communication device 22.

As discussed above, the position sensing system 24 can comprise, for example, a mobile transmitter 28 and a receiver 30. The mobile transmitter 28 can be transported by the mobile communication device 22 user. For example, the mobile transmitter 28 may be a key fob also used to operate the vehicle 15. It is also contemplated that the mobile transmitter 28 be incorporated into the mobile communication device 22 itself, as shown in FIG. 2.

The receiver 30 can be located within the vehicle 15 in any location desired or required by the manufacturer or installer. The mobile transmitter 28 relays its position, which is indicative of the position of the mobile communication device 22, to the receiver 30. For example, the mobile transmitter 28 can transmit signals and the receiver 30 can employ a vehicle antenna to receive the signals and can triangulate its position based upon the signals. This can be reversed, with the receiver 30 employing the vehicle antenna to transmit the signals and a mobile "transmitter" 28 receiving the signals, triangulating the position based upon the signals, and transmitting a signal back to the receiver 30 indicative of the position. The position can be independently determined with, for example, a GPS portable navigation device and transmitted to either the receiver 30 or the mobile transmitter 28. Additionally, multiple receivers 30 may be installed in the vehicle to facilitate triangulation of the position of the mobile transmitter 28. Those with skill in the art will recognize that these are provided by way of example and not limitation, and other position sensing systems can be used as desired or required.

The mobile transmitter 28 can communicate with the receiver 30 with electronic communication or with wireless communication. Examples of wireless communication are radio frequency broadcast transmission and infra red transmissions. These are provided by way of example and not limitation and other means of communication known to those skilled in the art can be used.

The method may further comprise step S6, providing a warning to a user of the mobile communication device 22 that the wireless device 20 has been deactivated. The warning may be an audio signal, a visual signal, or both. For example, the warning may be a beep, or a recorded voice. The signal may be a light that turns on or flashes, or an indication on a display of the mobile communication device 22. These are provided by way of example and are not meant to be limiting. Other warning signals known to those skilled in the art may be used. The warning may be emitted directly from the controller 26, or may be provided by the mobile transmitter 28 or mobile communication device 22 after receiving an output from the controller 26.

Step S7 can be reactivating the wireless device 20 if the controller 26 receives output from the position sensing system 24 that indicates the mobile communication device's 22 presence is within the vehicle 15 when the mobile communication device 22 reenters the vehicle 15. This would allow a user of the mobile communication device 22 to continue a conversation, for example when filling up with gas at a gas station, without any interruption.

Figure 7:
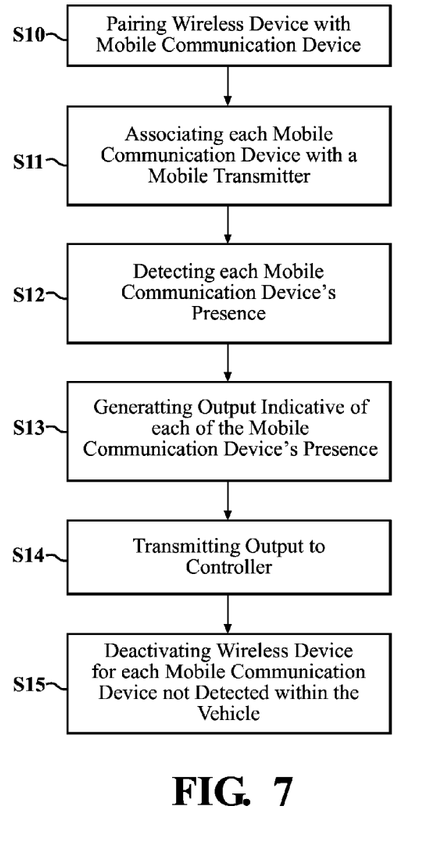
FIG. 7 is a flow chart of another example of a method of detecting the presence of a device within a vehicle.

Another embodiment of a method of detecting a presence of a device, illustrated in FIG. 7, can further comprise a position sensing system 24 having more than one mobile transmitter 28, 28', as discussed with reference to FIG. 5. Pairing S10 of the wireless device 20 can occur with more than one mobile communication device 22, 22'. In step S11, each mobile communication device 22, 22' can be associated with a mobile transmitter 28, 28'. Association of the mobile communication devices 22, 22' and mobile transmitters 28, 28' can be accomplished, for example, by programming the wireless device 20 to associate mobile communication device 22 with mobile transmitter 28 and mobile communication device 22' with mobile transmitter 28'. Alternatively, mobile communication device 22 can become associated with mobile transmitter 28 by being manufactured as an integral unit, and mobile communication device 22' can become associated with mobile transmitter 28' by being manufactured as an integral unit. In step S12, the presence or absence of each mobile communication device 22, 22' is detected. Generating S13 the output includes generating output indicative of each mobile communication device's presence 22, 22' within the vehicle 15. The output is communicated to a controller 26 responsive to the output in step S14.

In step S15, deactivating the wireless device 20 can include deactivating the wireless device 20 for each of the mobile communication devices 22, 22' when the output is indicative of the mobile communication device's absence 22, 22' from within the vehicle 15.

As a non-limiting example, a situation can arise where a driver and a passenger each have a key fob with a mobile transmitter 28, 28' that operates a shared vehicle 15, and each have a mobile communication device 22, 22' paired with the wireless device 20 of the vehicle 15. If both driver and passenger are in the vehicle, the wireless device 20 will typically only authenticate with one of the mobile communication devices 22, 22' at a time. Typically, the driver's mobile communication device 22 will take precedence over the passenger's mobile communication device 22'. This preference can be a function of the mobile communication devices 22, 22'. For example, one of the mobile communication devices 22 or 22' can be manually turned off. The preference may be a function of the wireless device 20, wherein the wireless device 20 is programmed with the preferences. These are provided as examples and are not meant to be limiting.

If the driver exits the vehicle 15 with the driver's mobile communication device 22, the position sensing system 24 will communicate to the controller 26, which will deactivate the wireless device 20 from operating with the driver's mobile communication device 22. At that time, if the passenger remains in the vehicle, the controller 26 can be programmed to activate the wireless device 20 to operate with the passenger's mobile communication device 22'. If the driver reenters the vehicle 15 while still using mobile communication device 22, it is contemplated that the controller 26 can be programmed to reactive the wireless device 20 with the driver's mobile communication device 22 and deactivate the wireless device 20 from the passenger's mobile communication device 22'. Alternatively, as desired or required, the controller 26 can be programmed to keep the wireless device 20 deactivated with the driver's mobile communication device 22 and maintain activation of the wireless device 20 with the passenger's mobile communication device 22' if the passenger is on the mobile communication device 22' at the time the driver reenters the vehicle 15.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A detection device for a vehicle comprising:
a wireless device inside a vehicle having a communication range;
a mobile communication device paired to the wireless device, such that the wireless device automatically activates upon sensing the mobile communication device within the communication range of the wireless device;
a position sensing system configured to detect the position of the mobile communication device with respect to the vehicle and to generate an output indicative of the mobile communication device's presence within the vehicle; and
a controller responsive to the output and configured to deactivate the wireless device when the mobile communication device is within the communication range of the wireless device and the output indicates that the mobile communication device's presence is not within the vehicle.

2. The detection device of claim 1, wherein the position sensing system comprises a mobile transmitter associated with the mobile communication device and a receiver located within the vehicle.

3. The detection device of claim 2, wherein the mobile transmitter is within the mobile communication device.

4. The detection device of claim 2, wherein the position sensing system comprises more than one mobile transmitter,
wherein the wireless device is paired with more than one mobile communication device, one mobile communication device associated with one of the more than one mobile transmitter,
wherein the receiver is configured to generate an output indicative of each mobile communication device's presence within the vehicle, and
wherein the controller is further configured to deactivate the wireless device for each of the mobile communication devices having an associated output indicative that the mobile communication device's presence is not within the vehicle.

5. The detection device of claim 2, further comprising:
a second mobile communication device paired to the wireless device, such that the wireless device automatically activates upon sensing the second mobile communication device within the communication range of the wireless device,
wherein the position sensing system is configured to generate a second output indicative of the second mobile communication device's presence within the passenger compartment of the vehicle, and
wherein when the first output is received by the controller indicative of the presence of the first mobile communication device's presence outside of the vehicle and the second output is received by the controller indicative of the second mobile communication device's presence within the vehicle, the controller automatically deactivates the wireless device for the first mobile communication device and automatically activates the wireless device for the second mobile communication device.

6. The detection device of claim 2, wherein the mobile transmitter is associated with the mobile communication device by the position sensing system to estimate the location of the mobile communication device based on the detected position of the mobile transmitter.

7. The detection device of claim 6, further comprising:
a second mobile communication device paired to the wireless device, such that the wireless device automatically activates upon sensing the second mobile communication device within the communication range of the wireless device; and
a second mobile transmitter that is associated with the second mobile communication device by the position sensing system, wherein the position sensing system is configured to generate a second output indicative of the second mobile communication device's presence within the passenger compartment of the vehicle, and wherein when the first output is received by the controller indicative of the presence of the first mobile communication device's presence outside of the vehicle and the second output is received by the controller indicative of the second mobile communication device's presence within the vehicle, the controller automatically deactivates the wireless device for the first mobile communication device and automatically activates the wireless device for the second mobile communication device.

8. The detection device of claim 1, wherein the controller is further configured to provide a warning upon deactivation of the wireless device.

9. The detection device of claim 1, wherein the controller is further configured to reactivate the wireless device if the controller receives output from the position sensing system that indicates the mobile communication device's presence is within the vehicle.

10. A detection device for a vehicle comprising:
a wireless device inside a vehicle;
a mobile communication device paired to the wireless device, such that the wireless device automatically activates when it senses the mobile communication device within an operable range of the wireless device;
a position sensing system comprising more than one mobile transmitter and a receiver located within the vehicle configured to generate an output indicative of the mobile communication device's presence within the vehicle; and
a controller responsive to the output and configured to deactivate the wireless device when the output indicates that the mobile communication device's presence is not within the vehicle,
wherein the wireless device is paired with more than one mobile communication device, one mobile communication device associated with one of the more than one mobile transmitter,
wherein the receiver is configured to generate an output indicative of each mobile communication device's presence within the vehicle,
wherein the controller is further configured to deactivate the wireless device for each of the mobile communication devices having an associated output indicative that the mobile communication device's presence is not within the vehicle, and
wherein one of the more than one mobile communication devices is associated with a driver and the other of the more than one mobile communication devices is associated with passengers, and wherein when an output is received by the controller indicative of the presence of the driver's mobile communication device's presence outside of the vehicle, the controller deactivates the wireless device for the driver's mobile communication device and activates the wireless device for the at least one of the passenger's mobile communication device.

11. A method of detecting a device within a vehicle comprising:
detecting a first position of a mobile communication device with respect to a communication range of a wireless device of the vehicle;
detecting a second position of the mobile communication device with respect to the vehicle with a position sensing system;
using a controller, automatically pairing the wireless device with the mobile communication device when the first position detected indicates the mobile communication device is within the communication range of the wireless device, and the second position detected indicates the mobile communication device is located within the vehicle; and
automatically unpairing the wireless device when the first position detected indicates the mobile communication device is within the communication range of the wireless device, and the second position detected indicates the mobile communication device is located outside of the vehicle.

12. The method of claim 11, wherein the position sensing system comprises a mobile transmitter associated with the mobile communication device and a receiver located within the vehicle, the receiver detecting a location of the mobile transmitter.

13. The method of claim 12, wherein the position sensing system comprises more than one mobile transmitter,
wherein pairing of the wireless device occurs with more than one mobile communication device, one mobile communication device associated with one of the more than one mobile transmitter,
wherein detecting the first position and detecting the second position includes detecting the first position and detecting the second position of each mobile communication device, and
wherein unpairing the wireless device includes unpairing the wireless device for each of the mobile communication devices when those mobile communication device's second position is not within the vehicle.

14. The method of claim 13, wherein one of the mobile communication devices is associated with a driver and the others are associated with passengers, and wherein when an output is received by the controller indicative of the driver's mobile communication device's second position being outside of the vehicle, unpairing of the wireless device includes unpairing of the wireless device for the driver and pairing of the wireless device for at least one of the passengers.

15. The method of claim 12, wherein the mobile transmitter is within the mobile communication device.

16. The method of claim 11 further comprising:
providing a warning upon unpairing of the wireless device.

17. The method of claim 12, further comprising:
associating the mobile transmitter with the mobile communication device by the position sensing system to estimate the location of the mobile communication device based on the detected position of the mobile transmitter.

18. The method of claim 17, further comprising:
detecting a first position of a second mobile communication device with respect to the communication range of the wireless device of the vehicle;
detecting a second position of the second mobile communication device with respect to the vehicle with the position sensing system;
automatically unpairing the wireless from the first mobile communication device when the first position of the first mobile communication device is detected to be within the communication range of the wireless device and the second position of the first mobile communication device is detected to be outside of the vehicle; and
automatically pairing the wireless device with the second mobile communication device upon sensing the first position of the second mobile communication device being within the communication range of the wireless device and the second position of the second mobile communication device being within the vehicle.

19. The method of claim 11 further comprising:
automatically pairing again the wireless device upon receiving an output from the position sensing system that indicates the mobile communication device's second position is within the vehicle.

20. The method of claim 11, further comprising:
detecting a first position of a second mobile communication device with respect to the communication range of the wireless device of the vehicle;
detecting a second position of the second mobile communication device with respect to the vehicle with the position sensing system;
automatically unpairing the wireless device from the first mobile communication device when the first position of the first mobile communication device is detected to be within the communication range of the wireless device and the second position of the first mobile communication device is detected to be outside of the vehicle; and
automatically pairing the wireless device with the second mobile communication device upon sensing the first position of the second mobile communication device being within the communication range of the wireless device and the second position of the second mobile communication device being within the vehicle.

* * * * *